United States Patent
Rill (10) Patent No.: US 9,268,522 B2
(45) Date of Patent: Feb. 23, 2016

(54) DEVICES AND METHODS FOR CONVEYING AUDIO INFORMATION IN VEHICLES

(75) Inventor: Florian Rill, Palo Alto, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 740 days.

(21) Appl. No.: 13/534,592

(22) Filed: Jun. 27, 2012

(65) Prior Publication Data

US 2014/0003620 A1   Jan. 2, 2014

(51) Int. Cl.
*H04B 1/00* (2006.01)
*G06F 3/16* (2006.01)
(Continued)

(52) U.S. Cl.
CPC .............. *G06F 3/165* (2013.01); *H04R 1/403* (2013.01); *H04R 2201/401* (2013.01); *H04S 3/008* (2013.01)

(58) Field of Classification Search
CPC ...... H04R 2499/13; H04R 27/00; H04R 5/02; H04R 5/04; H04R 5/023; H04R 2420/07; H04R 1/403; H04R 1/26; H04R 1/025; H04R 3/12; H04R 3/14; H04R 2205/024; H04R 2205/022; H04R 2227/003; H04R 2499/15; H04R 1/1401; H04R 1/1083; H04R 5/033; G10K 15/02; G10K 2210/1282; G10K 2210/503; G10K 11/178; G10K 11/175; G10K 11/1784; H04S 3/00; H04S 3/002; H04S 3/02; H04S 3/008; H04S 7/00; H04S 7/30; H04S 7/302; H04S 7/307; H04S 7/303; H04S 7/305; H04S 7/40; H04S 2420/01; H04S 2420/07; H04S 2400/11; H04S 2400/13; H04S 2400/05; H04S 2400/09; H04S 5/00; H04S 5/005; B60R 11/0217; B60R 11/0247; B60R 11/0264; B60R 2001/1223; B60R 2021/01315; H04N 21/41422; H04N 21/43637; H04N 21/8106; H04N 21/4122; H04M 2250/02; H04M 1/05; H04M 1/0237; H04M 1/0239; H04M 1/0216; H04M 1/2155; H04M 1/2474; H04M 1/6066; H04M 3/62; H04M 2203/6018; H04M 2203/6045; G06F 2203/0339; G06F 2203/0381; G06F 2203/0382; G06F 2203/04101; G06F 2203/04103; G06F 2203/04104; G06F 2203/04107; G06F 2203/04112; G06F 2203/04803; G06F 2203/04809
USPC ......... 381/1, 2, 6, 7, 11, 12, 17, 18, 300, 302, 381/303, 306, 307, 309, 310, 26, 27, 28, 61, 381/77, 78, 80, 81, 82, 84, 85, 86, 92, 122; 700/94; 455/420, 556.1, 575.2, 575.3, 455/575.4

See application file for complete search history.

(56) References Cited

U.S. PATENT DOCUMENTS

| | | | |
|---|---|---|---|
| 6,087,961 | A | 7/2000 | Markow |
| 7,916,039 | B2 | 3/2011 | Hess et al. |

(Continued)

FOREIGN PATENT DOCUMENTS

| | | |
|---|---|---|
| DE | 19652930 A1 | 6/1998 |
| DE | 102004048989 A1 | 4/2006 |

(Continued)

*Primary Examiner* — Leshui Zhang
(74) *Attorney, Agent, or Firm* — Barnes & Thornburg LLP (57) ABSTRACT

Various methods and devices for vehicles are provided, wherein directional output of sound is used. In some embodiments, speech signals assigned to different speakers in a telephone conference are reproduced with different directional characteristics. In other embodiments, menu items of a menu are reproduced using different directions. In some embodiments, a loudspeaker arrangement may be provided at a dashboard or in a backrest of a seat of the vehicle.

10 Claims, 9 Drawing Sheets

(51) Int. Cl.
*H04R 1/40* (2006.01)
*H04S 3/00* (2006.01)

(56) References Cited

U.S. PATENT DOCUMENTS

| | | |
|---|---|---|
| 2002/0029686 A1 | 3/2002 | Metcalf |
| 2004/0109575 A1 | 6/2004 | Thigpen |
| 2004/0208324 A1 | 10/2004 | Cheung et al. |
| 2005/0201549 A1 | 9/2005 | Dedieu et al. |
| 2005/0271219 A1* | 12/2005 | Bruelle-Drews ............... 381/86 |
| 2006/0104458 A1 | 5/2006 | Kenoyer et al. |
| 2006/0109988 A1 | 5/2006 | Metcalf |
| 2007/0116298 A1 | 5/2007 | Holmi et al. |
| 2008/0025518 A1* | 1/2008 | Mizuno et al. ............... 381/17 |
| 2008/0232601 A1 | 9/2008 | Pulkki |
| 2010/0311470 A1* | 12/2010 | Seo et al. ............... 455/566 |
| 2011/0103620 A1 | 5/2011 | Strauss et al. |

FOREIGN PATENT DOCUMENTS

| | | |
|---|---|---|
| DE | 102004048990 A1 | 4/2006 |
| DE | 102005003431 A1 | 8/2006 |
| EP | 2182744 A1 | 5/2010 |
| EP | 2373054 A1 | 10/2011 |
| WO | 2010128136 A1 | 11/2010 |

* cited by examiner

DEVICES AND METHODS FOR CONVEYING AUDIO INFORMATION IN VEHICLES

FIELD OF THE INVENTION

The present application relates to devices and methods for conveying audio information in vehicles.

BACKGROUND

In vehicles, different types of information are to be conveyed to a driver, for example navigation information, information regarding operation of the vehicle, for example of an infotainment system therefore, communication information, for example speech related to a telephone call, or driving assistance information. In most cases, the information is conveyed either as visual information (for example on displays, using gauges for example in a dashboard, using light emitting diodes or other light sources etc. or as audible information output via loudspeakers).

For example, methods and devices for outputting audible information are known from DE 10 2005 003 431 B4, DE 10 2004 048 990 A1, DE 196 529 30 A1 or U.S. Pat. No. 7,916,039.

In some of these cases, so-called beam forming is used to reproduce a sound which apparently comes from a specific direction, i.e. from a so-called virtual sound source.

In view of the increasing amount of information to be conveyed to occupants of a vehicle, in particular a driver of a vehicle, there is a continuing need for devices and methods which are able to convey information in an easy to understand manner so as to reduce distractions, for example for the driver, and make processing of the information for the respective occupant as easy as possible.

SUMMARY

According to an aspect, a vehicle is provided comprising a loudspeaker array, the loudspeaker array being provided at at least one position selected from the group consisting of a dashboard in front of a driver seat and a backrest of a seat of the vehicle.

In some embodiments, with a thus positioned loudspeaker array beam forming and virtual sound sources may be provided to the driver or to other occupants.

The loudspeaker array may comprise a plurality of, for example four or more, for example eight, loudspeakers, which are arranged in an arc shape.

According to another aspect, a method is provided, comprising
  providing an audio output in a vehicle corresponding to a plurality of menu items, wherein the audio output corresponding to a first menu item of the plurality of menu items is provided as being audible from a different direction than a second menu item of the plurality of menu items.

In such embodiments, the first and second menu items are easily discernible for an occupant of the vehicle.

In some embodiments, the method further comprises selecting a menu item by performing a gesture related to the direction associated with the respective menu item.

According to another aspect, a corresponding device is provided.

According to a further aspect, a method is provided, comprising:
  providing audio output in a vehicle corresponding to a plurality of speakers, for example in a telephone conference, wherein sound sources with different positions are assigned to different speakers. The sound sources in particular may be virtual sound sources created by beam forming.

In this way, different speakers, for example in a telephone conference, may be easily discerned from each other.

According to another aspect, a corresponding device for a vehicle is provided.

Features of the above aspects and embodiments may be combined with each other.

The above summary is merely intended to give a brief overview over some features of some embodiments of the invention and is not to be construed as limiting. In particular, other embodiments and aspects may comprise different features than the features mentioned above.

BRIEF DESCRIPTION OF THE DRAWINGS

Further embodiments will be described with reference to the attached drawings, wherein.

In the following, embodiments of the present invention will be described in detail. Features of different embodiments described may be combined with each other unless specifically noted otherwise. On the other hand, describing an embodiment with a plurality of features is not to be construed as indicating that all those features are necessary for practicing the invention, as other embodiments may comprise less features and/or alternative features. For example, some embodiments are described as having a plurality of different functions. Other embodiments may implement only some of these functions or only one of these functions. In yet other embodiments, different functions may be implemented.

Figure 1:
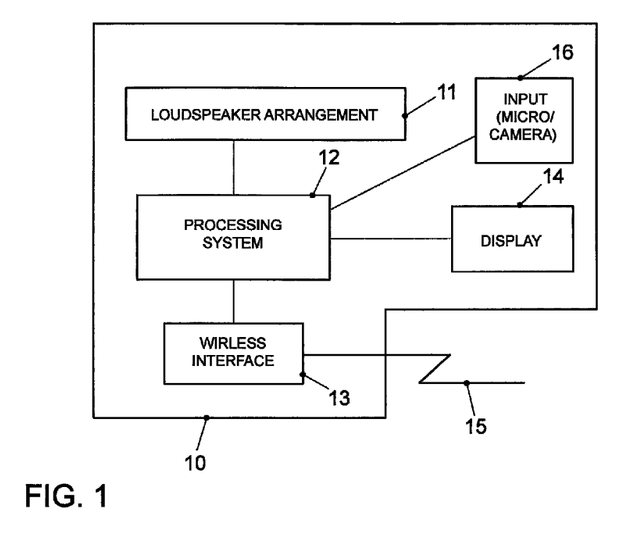
FIG. 1 is a block diagram illustrating a system according to an embodiment.

Turning now to the figures, in FIG. 1 a block diagram of a system according to an embodiment which may be incorporated in a vehicle 10 is shown.

The system comprises a processing system 12 controlling a loudspeaker arrangement 11 to reproduce sounds. In particular, processing system 12 may control loudspeaker arrangement 11 to perform beam forming, i.e. to reproduce sound in a manner such that the sounds appear to originate from a virtual sound source which needs not coincide with a loudspeaker of the loudspeaker arrangement. As beam forming per se is a conventional technique known to persons skilled in the art, it will not be described in detail here. Generally, beam forming uses constructive and destructive interference between sound waves originating from a plurality of loudspeakers of a loudspeaker arrangement to create a desired effect. Embodiments of suitable loudspeaker arrangements will be described further below.

Generally speaking, a beam forming algorithm will process an audio signal on an input side and create individual signals for all loudspeakers, for example loudspeakers in the array, based for example on fixed calculations and variable parameters. When these signals are reproduced over the loudspeaker array, they will, based on their predetermined differences, cancel each other out in specific physical locations and add up (constructive interference) in other locations. The more loudspeakers are used, the more flexible can the destructive and constructive wave interference be used.

In some embodiments, the beam forming technology in combination with a loudspeaker array is used to create two acoustic beams extending in the direction of a listener, for example driver, one for the left ear and one for the right ear. As these beams are directed at the listener in narrow cones, reflections from other objects are minimized and psychoacoustic effects can be used to create virtual sound sources. In other words, as already explained above, this means that a listener may perceive sounds from certain directions, i.e. virtual sound sources, even though there is no loudspeaker at that specific location.

Processing system 12 is furthermore coupled with a display 14 where visual information, for example menus, information regarding navigation or information regarding other functions of vehicle 10, may be output, and with a user input 16 which enables a user to input information into the system. User input 16 may comprise elements like knobs, buttons or sliders, but also may comprise for example a microphone to receive speech input and/or a camera to recognize gestures made by an occupant of vehicle 10. Also, in some embodiments display 14 may be a touch-sensitive display (also referred to as touchscreen) and may therefore form part of user input 16.

Furthermore, the system of FIG. 1 comprises a wireless interface 13 to couple the system with a wireless network, for example a cellular telephone network, as indicated by 15 in FIG. 1. In particular, in this way the system shown may serve as a hands-free telecommunication system usable for example for telephone calls as will be explained further below.

Wireless interface 13 may for example be a mobile phone coupled to processing system 12 via a wire-based connection or a wireless connection like Bluetooth.

In some embodiments, processing system 12, as will be explained below, may also be configured to receive information from other parts of the vehicle and to effect a corresponding audio output using beam forming. For example, processing system 12 may be coupled with a blind spot detection system and will inform the driver if there is an object in his left or right blind spot by giving an audio output via loudspeaker arrangement 11 where the above-mentioned virtual sound source is in the direction of the detected objects. Also, processing system 12 may comprise a navigation system, and navigation instructions may be output corresponding to the instructions. For example, an instruction to turn right may be output as appearing to come from the right. Similar considerations apply to other vehicle systems like a lane departure warning or a parking distance control.

Further examples for the use of virtual sound sources and directional sound output will be explained further below after a discussion of some possibilities of implementing hardware according to an embodiment.

Figure 2:
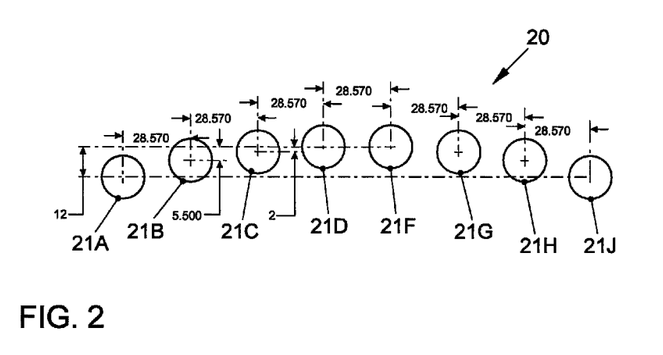
FIG. 2 illustrates a loudspeaker arrangement according to an embodiment.

In FIG. 2, a loudspeaker arrangement 20, usable for example as loudspeaker arrangement 11 of FIG. 1 or part thereof is shown. In the embodiment of FIG. 2, loudspeaker array 20 comprises eight loudspeakers 21A-21J, collectively referred to as loudspeakers 21. While eight loudspeakers 21 are shown in the embodiment of FIG. 2, in other embodiments a different number of loudspeakers may be used. The loudspeakers are arranged in an arc shape, i.e. along an arc, with distances given in millimeters in FIG. 2 being only examples for possible distances, and depending on the application other distances may be used. Such an arc shape is e.g. suitable for integration with a dashboard, e.g. a curved dashboard, examples for which will be shown further below. In other embodiments, other arrangements than an arc shape may be used. Also the size of the loudspeakers may vary greatly. As will be explained below using specific embodiments as examples, the loudspeakers may be installed in an enclosure which may for example provide a separate sealed air volume for each of the loudspeakers, but may also be provided in a common enclosure or without an enclosure. The loudspeakers may be installed in different vertical and horizontal locations in a vehicle.

Such a loudspeaker array in embodiments may be placed in front of or behind an intended listener and may provide, in some embodiments, a horizontal location area of up to 180°, i.e. a virtual sound source may be created within a direction range of approximately 180°.

Figure 3:
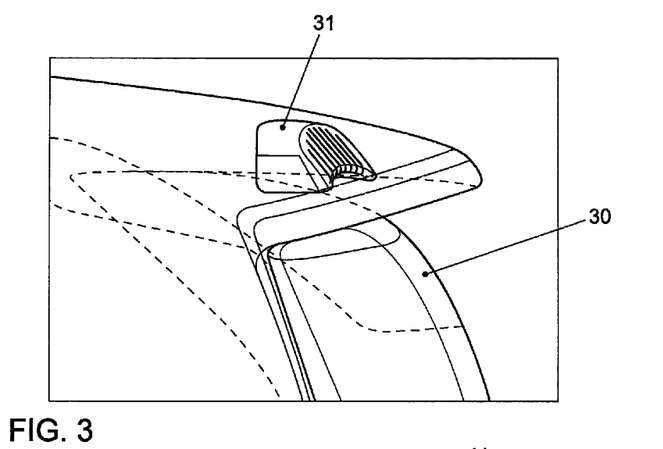
FIG. 3 illustrates the placement of a loudspeaker arrangement according to an embodiment.
Figure 4:
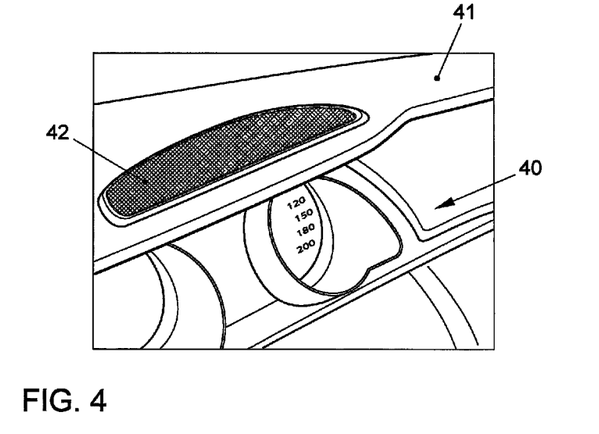
FIG. 4 illustrates a placement of a loudspeaker arrangement according to another embodiment.
Figure 5:
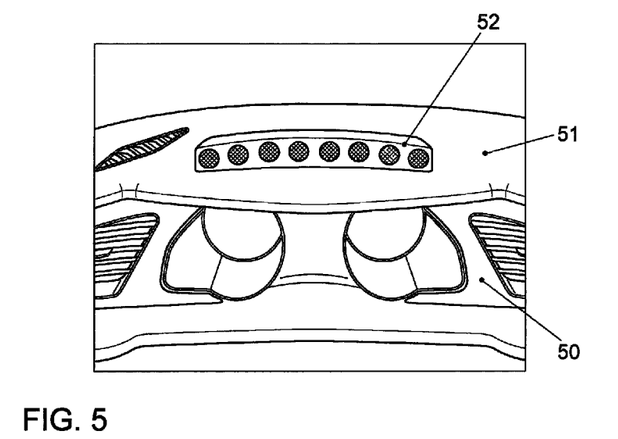
FIG. 5 illustrates a placement of a loudspeaker arrangement according to a further embodiment.
Figure 6:
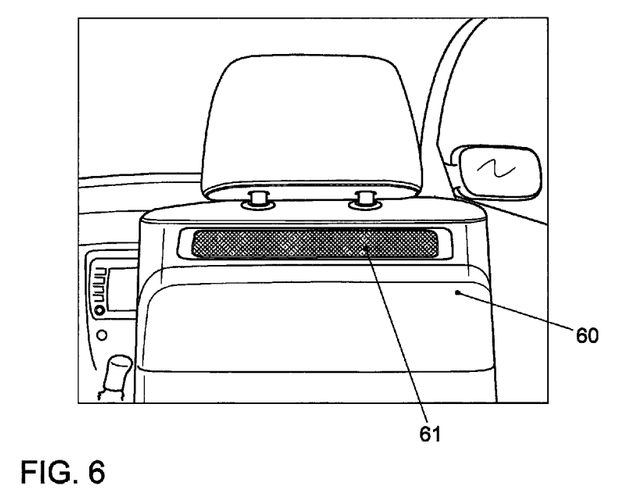
FIG. 6 illustrates a placement of a loudspeaker arrangement according to a further embodiment.

A loudspeaker array like for example the loudspeaker array shown in FIG. 2 may for example be placed at a dashboard of a vehicle for example on top thereof, as shown in FIGS. 3 and 4. FIG. 3 shows a dashboard 30 with a loudspeaker array 31 on top thereof directed at a driver, and FIG. 4 shows a dashboard 40 with a topside 41 in which a loudspeaker array 42 is integrated. A further corresponding example is shown in FIG. 5, where a loudspeaker array 52 is placed on the topside 51 of a dashboard 50. With the embodiments of FIGS. 3-5, audio output using beam forming may be provided to a driver. Similar arrangements are possible for a front seat passenger. For rear seat passengers, loudspeaker arrays may be integrated in backrests of front seats. A corresponding embodiment is shown in FIG. 6, where a loudspeaker array 61 is integrated in a backrest 60 of a front seat.

Figure 7:
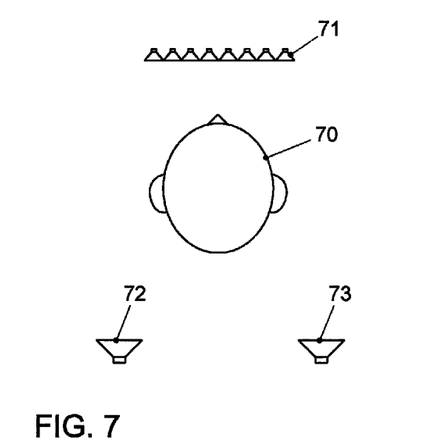
FIG. 7 illustrates a loudspeaker arrangement according to an embodiment.

Loudspeaker arrays like the loudspeaker array shown in FIG. 2 may be combined with other loudspeaker arrays or also with single loudspeakers. For example, with a loudspeaker array in front of a person, for example a driver, and a further loudspeaker array behind the person, beam forming from almost every direction may be achieved. If, on the other hand, for some directions only a low resolution as regards the beam forming is needed, conventional loudspeakers may be used. A corresponding example is shown in FIG. 7, where a loudspeaker array 71 is placed in front of a person 70, while two single loudspeakers 72, 73 are placed behind the person 70.

Figure 8:
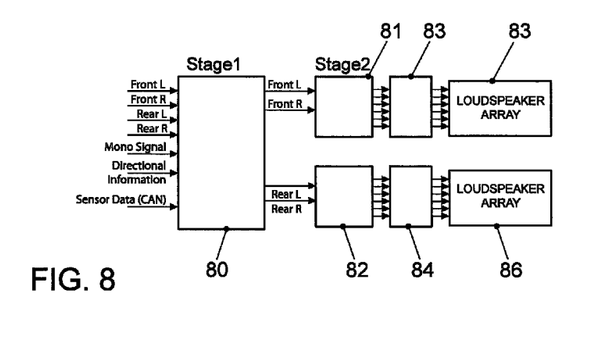
FIG. 8 illustrates some portions of a processing system according to an embodiment.

In FIG. 8, an example for a portion of a processing system, for example processing system 12 of FIG. 1, is shown. However, the use of the embodiment of FIG. 8 is not restricted to the embodiment of FIG. 1, but may generally be used for controlling loudspeaker arrays.

In the embodiment of FIG. 8, as an example two loudspeaker arrays 85, 86 are controlled, where loudspeaker array 85 is assumed to be placed in front of an intended listener and loudspeaker array 86 is assumed to be placed behind the listener. However, in other embodiments only one loudspeaker array may be provided, and the corresponding portions controlling the other loudspeaker array may be omitted. In still other embodiments, instead of one of the loudspeaker array single loudspeakers as explained for example with reference to FIG. 7 may be used.

The embodiment of FIG. 8 comprises a first stage 8 which may receive inputs from various components within a vehicle. For example, from a music reproduction device (radio, CD player etc.) signals for front left, front rear, rear left and rear right loudspeakers may be received. Furthermore, a monaural signal together with directional information may be received, for example a speech signal as will be explained further below. Also, sensor data from vehicle sensors may be received, for example via a bus like a CAN bus. The first signal processing stage 80 "unifies" the various signals and routes them to appropriate outputs labeled front left, front right, rear left and rear right in FIG. 8. Relative strength of these signals may determine a direction of a virtual sound source.

Furthermore, individual second stages 81, 82 are provided which process audio inputs received from the first stage and create individual audio outputs for loudspeakers in the respective loudspeaker array based on for example preset beam forming parameters like time, phase, frequency domain etc. It should be noted while the second stage is depicted as two separate entities 81, 82, the two entities may also be implemented together and/or may be implemented together with the first stage 80.

Following the second stages 81, 82 are respective amplifier arrangements 83, 84 which in turn output the corresponding signals to loudspeaker arrays 85, 86 as shown. The entities 81, 82 of the second stage may comprise a communication interface and a memory so that parameters relevant for signal processing may be written to the memory or read from the memory.

As mentioned above, directional audio output in vehicles using beam forming may be used for different applications, i.e. for outputting different kinds of signals in the vehicle. Two specific applications will be described next with reference to FIGS. 9-15.

Figure 9:
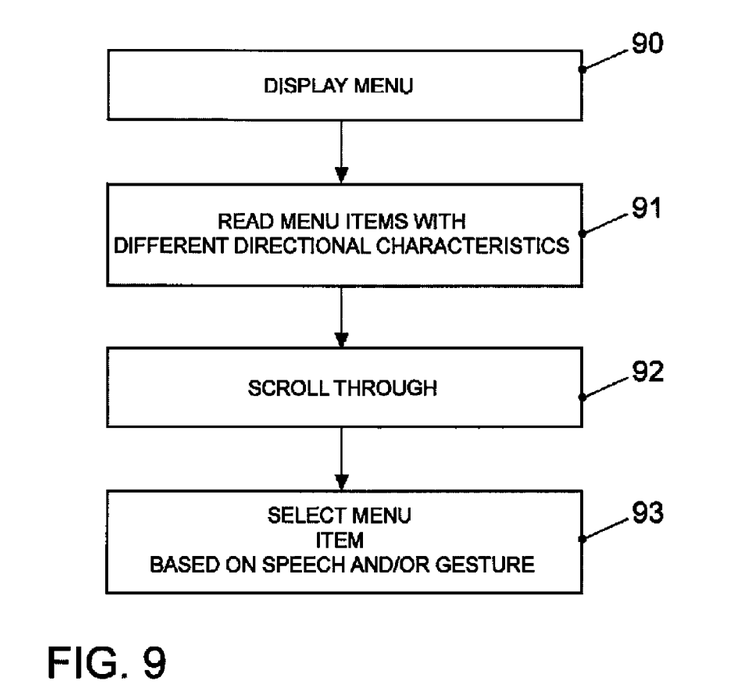
FIG. 9 is a flowchart illustrating a method according to an embodiment.

In FIG. 9, an embodiment of a method according to an embodiment is shown which may be implemented in the embodiment of FIG. 1, but also may be implemented independently therefrom in other systems capable of using beam forming and/or different sound sources. While the method of FIG. 9 is represented as a series of acts or events, the shown order of the acts or events should not be construed as limiting, as other orders may be used or various acts or events may be performed concurrently with each other or concurrently with other events. Moreover, some of the acts or events described with reference to FIG. 9 may be omitted.

Figure 10:
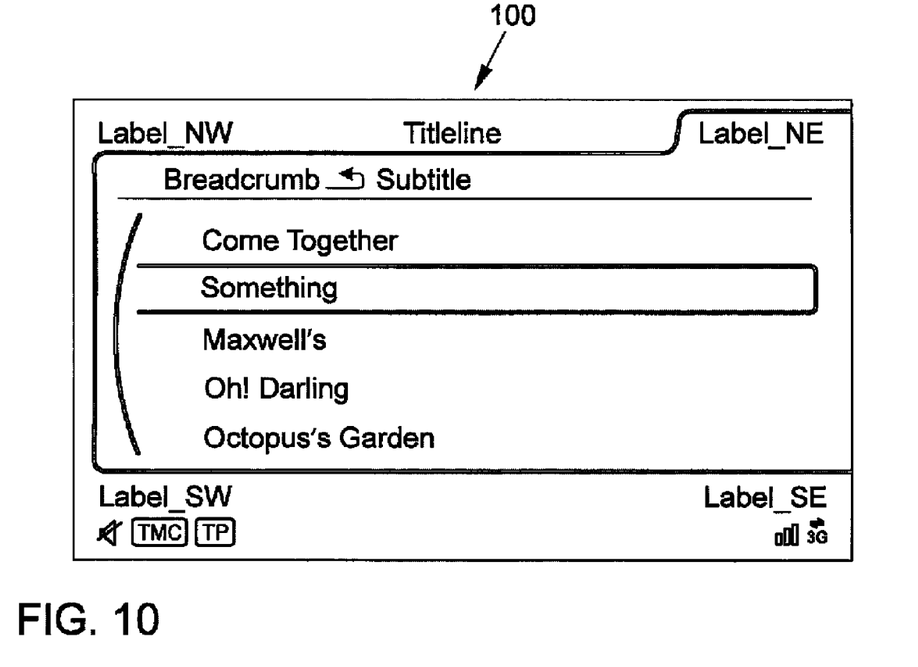
FIGS. 10 and 11 illustrate menu displays according to some embodiments.
Figure 11:
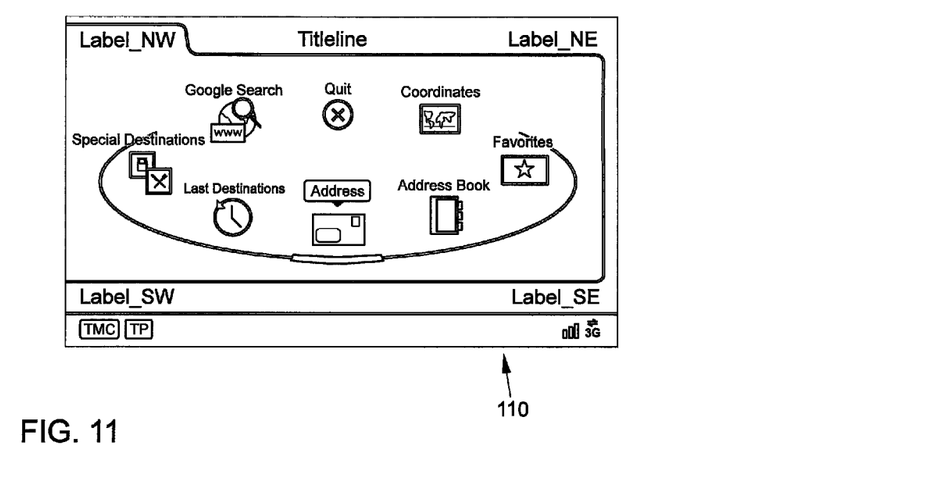

At 90, a menu is displayed on a display screen in the vehicle, for example display 14 of FIG. 1. A menu generally relates to a possibility for a user, for example a driver of the vehicle, to chose between various options or actions. Such menus may be used in various instances like music reproduction, navigation or also for general operation e.g. of a so-called infotainment system in a vehicle. Examples for menus are shown in FIGS. 10 and 11. In FIG. 10, an example for a display 100 is shown where a menu of various song titles is shown in a list. By choosing one of the titles, the corresponding music piece is reproduced.

In FIG. 11, an example of a display 110 is shown where different actions may be performed. The menu items are shown in a circle.

Figure 12A:
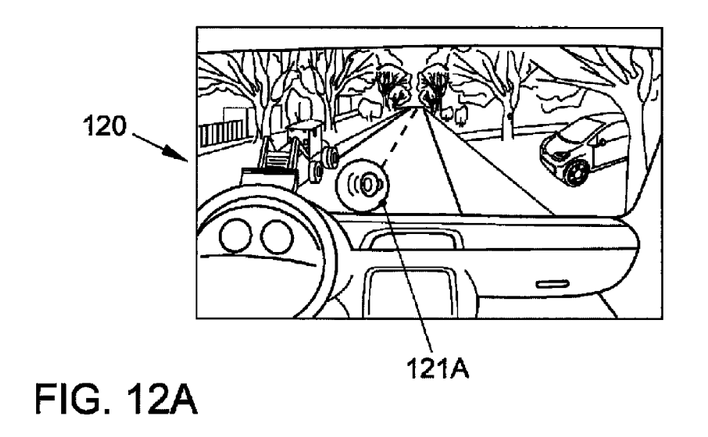
FIGS. 12A-12C illustrate sound locations usable in some embodiments.
Figure 12B:
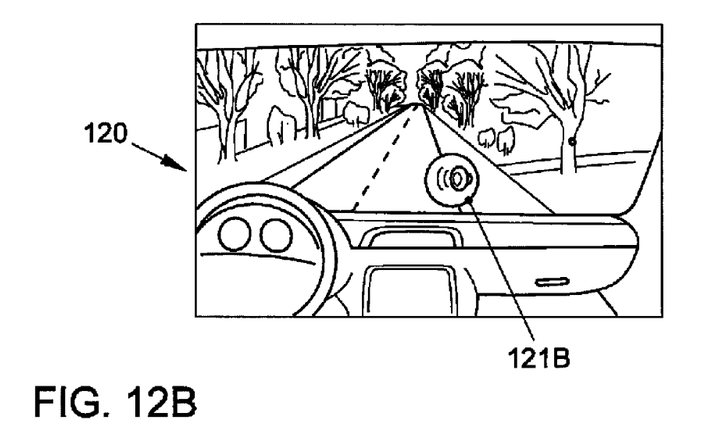
Figure 12C:
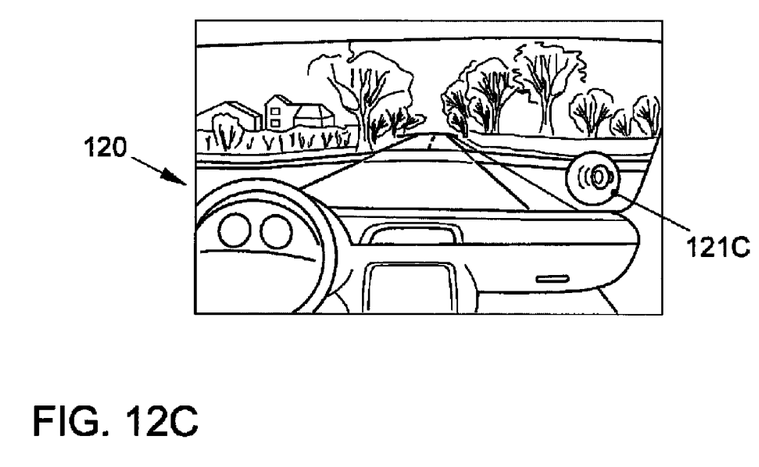

Returning to FIG. 9, at 91 the menu items are additionally "read" to a user, i.e. reproduced as audio speech using a text-to-speech algorithm. In the embodiment of FIG. 9, different menu items are reproduced using audio sounds coming from different directions (i.e. using different virtual or real sound sources) or, in other word, different menu items may have different directional characteristics. For example, using FIG. 12 as illustrating example, in FIG. 12 a cockpit 120 of vehicle is shown. A first menu item may for example be reproduced based on a virtual sound source 121A as shown in FIG. 12A, a second menu item may be reproduced using a virtual sound source 121B as shown in FIG. 12B, and a third menu item may be reproduced using a virtual sound source 121C as shown in FIG. 12C. Further menu items may be reproduced using further virtual sound sources. By associating different menu items with different directions, i.e. different virtual sound sources, the different menu items may be easily discerned by a user. Preferably, for the same menu the association between directions and menu items is fixed, such when the user uses the menu a plurality of times, he/she becomes accustomed to the direction.

At 92, optionally a user may scroll through the menu, for example by gestures recognized by a camera as mentioned with respect to FIG. 1. At 93, the user may select a menu item, for example based on speech (by speaking the corresponding menu item) or also based on a gesture. The gesture in particular may be a gesture associated with the direction of the corresponding virtual sound source, for example a nod of the head in this direction or a gesture with the hand in this direction. In this way, menu items may be easily selected without for example a driver of a car having to look at the display, which may distract the driver from traffic on the street.

Figure 15:
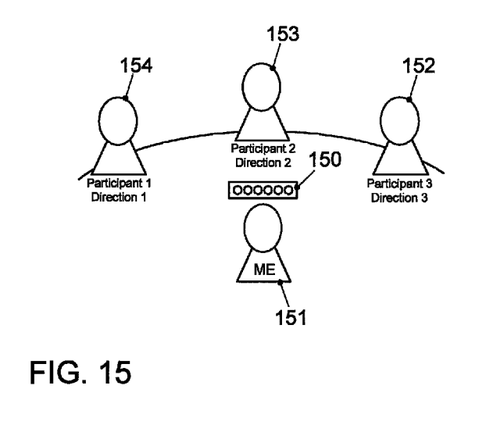
FIG. 15 is a diagram illustrating some features of some embodiments corresponding to the method of FIG. 13.

A further application of audio output with specific directional characteristics will now be explained with reference to FIGS. 13 and 15.

In many cases, vehicles are equipped with hands-free speaking system enabling a driver to communicate via telephone without for example taking his or her hands from a steering wheel. In many countries, it is even forbidding for a driver of a vehicle while driving to use a mobile phone without the use of a hands-free kit.

However, doing telephone conferences, i.e. telephone calls with more than two participants, via conventional hands-free kits still demands a considerable amount of concentration from a driver, as all voices of the other participants come from the same direction, for example from a specific loudspeaker. With beam forming as used in the embodiment of FIG. 13, the concentration needed for a driver may be reduced by assigning different virtual sound sources to different participants of a telephone conference.

Figure 13:
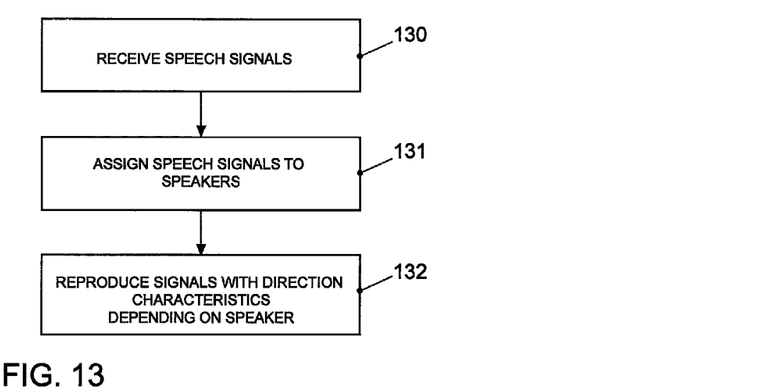
FIG. 13 is a flowchart illustrating a method according to a further embodiment.

In FIG. 13, a flow chart illustrating a method according to an embodiment is shown which may for example be implemented in the system of FIG. 1, but which also may be used independently therefrom. As explained for the embodiment of FIG. 9, also in FIG. 13 the order in which acts or events are described is not to be construed as limiting.

At 130 in FIG. 13, speech signals are received, for example via a wireless network and mobile phone as explained with reference to FIG. 1.

At 131, the speech signals are assigned to different speakers. This information, i.e. the information which speech signals correspond to which speakers, may also already be present in the received speech signals. In other cases, the assignment at 131 may for example be made based on a frequency of the speech or based on other characteristic properties.

At 132, the signals are reproduced, i.e. a corresponding speech output is made via a loudspeaker arrangement like arrangement 11 of FIG. 1, with direction characteristics depending on the respective speaker. To achieve this, beam forming may be used. In other embodiments, where for example no loudspeaker array, but only simple loudspeakers are used, different loudspeakers may be assigned to different speakers.

Figure 14:
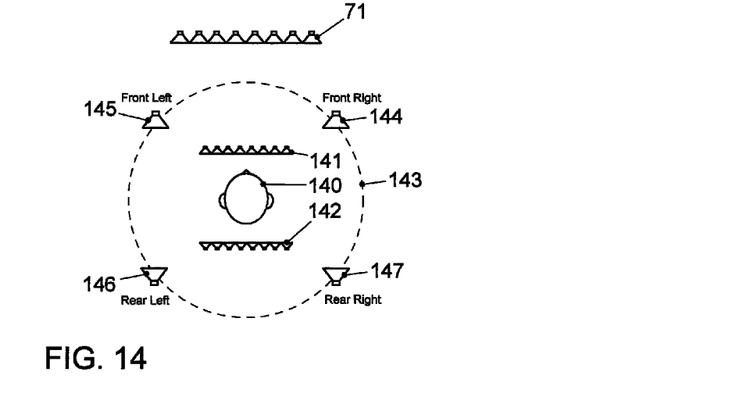
FIG. 14 is a diagram for illustrating some features of an embodiment corresponding to the method of FIG. 13.

For example, as shown in FIG. 14, two loudspeaker arrays 141, 142 may be provided in front of and behind of a person 140, for example a driver. Four virtual sound sources 144-147 may be used which in the example of FIG. 14 are arranged on a virtual circle 143 for different speakers in a telephone conference. A further example using only a single loudspeaker array 150 in front of a person 151 is shown in FIG. 15. Here, virtual sound sources 152-154 may be used for three different remote participants corresponding to three different directions, which gives the acoustic impression of the three participants sitting as shown in FIG. 15.

It should be noted that such an audio output may be used together with a video conference displayed on a display, but may also be used as a "pure" telephone conference.

As already indicated, the above embodiments may be combined with each other unless specifically noted otherwise. For example, a single system like a system of FIG. 1 may implement both the method of FIG. 9 and the method of FIG. 13, or may implement only one of the methods. The method of FIG. 9 and/or 13 may be implemented using the hardware described with reference to FIGS. 1-8, but may also be implemented using different hardware. For example, in some embodiments other loudspeaker arrangements which do not incorporate a loudspeaker array using beam forming may be used. For instance, a loudspeaker arrangement with a plurality of individual loudspeakers, e.g. 4 loudspeakers (two front speakers and two rear speakers) may be used, and different menu items and/or different speakers of a telephone conference may be assigned to different loudspeakers, i.e. the respectively assigned loudspeaker may be used for the respective sound reproduction. Therefore, the above-described embodiments are not to be construed as limiting the scope of the invention in any way.

What is claimed is:

1. A method, comprising:
    outputting audio in a vehicle corresponding to a plurality of menu items in a vehicle display via a loudspeaker arrangement;
    generating, in response to a selection of a first menu item of the plurality of menu items, a sound perceived to be audible from a first direction; and
    generating, in response to a selection of a second menu item of the plurality of menu items, a sound perceived to be audible from a second direction,
    wherein the second direction is different from the first direction, and
    wherein the generation of the sounds perceived to be audible from the first and second directions is performed by beam forming using interference between sound waves originating from a plurality of loudspeakers in the loudspeaker arrangement.

2. The method of claim 1, further comprising
    detecting a gesture of a user, and
    selecting a menu item depending on a direction of the detected gesture.

3. The method of claim 1, wherein generating the sound perceived to be audible in the first direction and generating the sound perceived to be audible in the second direction further comprises:
    processing an audio signal on an input side, and
    creating individual signals for the plurality of loudspeakers,
    wherein reproduction of the individual signals will cancel each other out at specific physical locations and add up in other physical locations.

4. The method of claim 1, wherein generation of the sounds performed by the beam forming includes constructive and destructive interference between sound waves originating from the plurality of loudspeakers in order to generate the sounds by the beam forming.

5. A device, comprising:
    a loudspeaker arrangement,
    a processing unit, the processing unit being configured to control the loudspeaker arrangement to generate an audio output in a vehicle corresponding to a plurality of menu items in a vehicle display, such that a first menu item of the plurality of menu items is provided with a first sound that is perceived to be audible from a first direction, a second menu item is provided with a second sound that is perceived to be audible from a second direction, wherein the second direction is different from the first direction, and wherein the generation of the sounds perceived to be audible from the first and second directions is performed by beam forming using interference between sound waves originating from a plurality of loudspeakers in the loudspeaker arrangement.

6. The device of claim 5, further comprising a user input to capture a gesture of a user, wherein the processing unit is configured to select a menu item based on a direction of the gesture.

7. The device of claim 5, further comprising a microphone, wherein a processing system is configured to select a menu item depending on sound received via the microphone.

8. The device of claim 5, wherein the loudspeaker arrangement comprises a loudspeaker array, said loudspeaker array being positioned at a position selected from the group consisting of a position in a dashboard of the vehicle and a position in a backrest of a seat of the vehicle.

9. The device of claim 5, wherein the processing unit uses constructive and destructive interference between sound waves originating from the plurality of loudspeakers in order to generate the sounds by the beam forming.

10. The device of claim 5, wherein the processing unit is configured to process an audio signal on an input side and create individual signals for the plurality of loudspeakers, wherein reproduction of the individual signals will cancel each other out at specific physical locations and add up in other physical locations.

* * * * *